United States Patent [19]

Gage

[11] Patent Number: 5,334,643
[45] Date of Patent: Aug. 2, 1994

[54] PEELABLE THERMOPLASTIC FILM

[75] Inventor: Paul D. Gage, Eau Claire, Wis.

[73] Assignee: Rexene Products Company, Dallas, Tex.

[21] Appl. No.: 725,893

[22] Filed: Jul. 1, 1991

Related U.S. Application Data

[63] Continuation of Ser. No. 443,173, Nov. 30, 1989, abandoned.

[51] Int. Cl.$^5$ .............................................. C08K 5/20
[52] U.S. Cl. ................................. 524/232; 524/505; 524/524; 524/563
[58] Field of Search .............. 524/230, 232, 505, 563, 524/524

[56] References Cited

U.S. PATENT DOCUMENTS

| | | | |
|---|---|---|---|
| 3,470,122 | 9/1969 | Ridgeway et al. | 524/230 |
| 3,515,528 | 6/1970 | Luther et al. | 524/230 |
| 3,595,827 | 7/1971 | Foster | 524/230 |
| 4,082,877 | 4/1978 | Shadle | 428/35 |
| 4,476,180 | 10/1984 | Wnuk | 428/220 |
| 4,500,021 | 2/1985 | Bildusas | 428/906 |
| 4,655,760 | 4/1987 | Morman et al. | 156/183 |
| 4,692,371 | 9/1987 | Morman et al. | 525/314 |
| 4,789,699 | 12/1988 | Kieffer et al. | 524/271 |
| 4,880,682 | 11/1989 | Hazelton et al. | 428/517 |

OTHER PUBLICATIONS

U.S. patent application Ser. No. 760,691 (abandoned).

*Primary Examiner*—John C. Bleutge
*Assistant Examiner*—Mark Sweet
*Attorney, Agent, or Firm*—Harold E. Meier

[57] ABSTRACT

Heat-sealable thermoplastic elastomeric films comprise from approximately 35% to about 65% of an A-B-A block copolymer wherein "A" blocks are derived from polystrene or a polystrene homolog and said "B" blocks being derived from lower alkenes and from about 25% to about 55% of an ethylene vinyl acetate copolymer, the ethylene vinyl acetate copolymer comprising approximately 28% vinyl acetate. The films are heat-sealable to various substrates including polyvinyl chloride. Once sealed to the substrate, the film may be readily peeled from the substrate by the application of a low and relatively constant peel force. A method for measuring the peel strengths of the film is disclosed. The films are especially adapted to being heat-sealed to a substrate which forms, together with the substrate a package, or multiple serially connected packages. Since the films may be peeled from such a substrate by the application of a low and relatively constant peel force, the films may be peeled from the substrate and the packaged articles extracted from the compartments in a controlled manner. Shear forces generated by flexing or winding the substrate are absorbed by the films without affecting the seal formed with the substrate.

10 Claims, No Drawings

PEELABLE THERMOPLASTIC FILM

This application is a continuation of U.S. Ser. No. 07/443,173 filed Nov. 30, 1989, now abandoned.

TECHNICAL FIELD

This invention relates to films that are made from a blend of an elastomeric block copolymer, ethylene vinyl acetate and one or more anti-blocking materials. The films are adapted to form a peelable seal with various substrates including polyvinyl chloride.

BACKGROUND OF THE INVENTION

Thermoplastic elastomers are polymeric compositions that are used in the manufacture of a wide variety of products ranging from shoe soles to stretch wrap films, Such films have numerous commercial applications. For example, U.S. Pat. No. 4,166,464 issued to Korpman on Sep. 4, 1979 discloses a laminated absorbent dressing incorporating an elastic backing film made from a blend including thermoplastic elastomers, U.S. Pat. No. 4,476,180 issued to Wnuk on Oct. 9, 1984 also discloses films incorporating thermoplastic elastomers.

A need has arisen, however, for a film that may be heat sealed to various substrates and subsequently peeled from the substrate with a low and relatively constant peel force. The ability to peel the film from the substrate through the application of a uniform relatively low peel force is especially important in the case where the film has been heat sealed to a substrate which forms, together with the film, a package, or multiple serially connected packages. In the case of serially connected packages, if excessive or non-uniform force is required to peel the film from the substrate, it is exceedingly difficult to open the individual packages and extract the packaged items in a controlled fashion either mechanically or manually. It is highly desirable that the film be transparent to allow visual inspection of the packaged articles and that the film possess sufficient antiblocking properties to prevent the packaged articles from adhering to the film when the film is peeled from the substrate. It is also highly desirable that the elastic properties of the film be sufficient to allow the serially connected compartments to be flexed or wound without damaging the integrity of the seal formed between the substrate and the film. Thus, the elastic properties of the film should be sufficient to resist the shear force created when the substrate is flexed or wound without separating from the substrate.

SUMMARY OF THE INVENTION

The present invention provides a film that is readily heat sealable to a variety of substrates, including polyvinyl chloride, and which can be removed from the substrate through the application of a uniform relatively low peel force. Thus, the present invention provides a film that is particularly adaptable for use in connection with a substrate which forms, together with the film, a package or multiple serially connected packages.

The invention described herein is a thermoplastic film formed from a blend of: from about 35% to about 65% of a mineral oil filled elastomeric block copolymer of polystyrene or polystyrene homolog and an ethylene butene random copolymer; from about 15% to about 65% of an ethylene vinyl acetate copolymer comprising approximately 28% vinyl acetate; and, from about 10% to about 20% slip and anti-block agents. The film is from approximately 0.0005" to 0.02" in thickness.

The termpolymer, as used herein, refers generically to homopolymers and to copolymers derived from two or more monomers. All percentages identified herein are on a weight basis unless otherwise indicated.

DETAILED DESCRIPTION OF THE INVENTION

The present invention relates to a film that is formed from a blend of at least two copolymers with at least one anti-blocking material. The first copolymer is an elastomeric A-B-A block copolymer, the A blocks being derived from polystyrene or polystyrene homolog. The B blocks are derived from lower alkenes. The second copolymer is an ethylene vinyl acetate copolymer comprising approximately 28% vinyl acetate. Erucamide slip and anti-block materials are used in conjunction with the two copolymers. The blend may optionally contain a second anti-block concentrate. The second anti-block concentrate is a blend of low density polyethylene and silica.

The A-B-A Block Copolymer

The A-B-A block copolymer contemplated for use in the present invention is a known material consisting of a mineral oil filled block copolymer of polystyrene or polystyrene homolog with an ethylene-butene random copolymer. The copolymer includes approximately 30% by weight mineral oil. The polymer component consists of approximately: 42% by weight of ethylene; 28–31% by weight of polystyrene or polystyrene homolog; 20% butene; and 7–10% free polystyrene homopolymer.

The A block of the block copolymer consists of polystyrene or polystyrene homolog and the B block of the block copolymer consists of an ethylene butene random copolymer. The molecular weight of the block copolymer is such that it has a melt index of approximately 7.8 as determined by ASTM method D 1238 "Standard Test Method for FLOW WEIGHTS OF THERMOPLASTICS BY EXTRUSION PLASTOMETERS," Condition G. The density of the A-B--A block copolymer is approximately 0.93 gm/cm$^3$. The preferred block copolymer is commercially available from the Shell Chemical Company, Polymers Division, Houston, Tex., under the trade designation G2780.

The thermoplastic elastomeric films of the present invention may contain from approximately 35% to approximately 65% by weight of the mineral oil filled elastomeric block copolymer; preferably from about 40% to about 60% by weight; especially preferred is from about 45% to about 55% by weight.

Ethylene Vinyl Acetate Copolymer

The second copolymer of the films of the present invention is an ethylene vinyl acetate copolymer containing approximately 28% by weight of vinyl acetate. The ethylene vinyl acetate copolymer has a density of approximately 0.95 gm/cm$^3$ and a melt index of approximately 0.30 as determined by ASTM method D 1238 Condition B. An ethylene vinyl acetate copolymer suitable for use in connection with the present invention is commercially available from U.S. Industrial Chemicals, Co., Cincinnati, Ohio 45249 under the trade designation UE-645. The thermoplastic elastomeric films of the present invention may contain from approximately 15% to approximately 55% by weight ethylene vinyl acetate copolymer.

Slip and Anti-Block Agents

The thermoplastic elastomeric films of the present invention contain one or more slip and anti-block agents. One such agent is an erucamide slip and anti-block agent available from Du Pont Company, Polymer Products Dept., Wilmington, Delaware 19898 under the trade designation CE-9619-1. The erucamide slip and anti-block agent consists of approximately 7% by weight erucamide, 20% by weight silica and 73% by weight ethylene vinyl acetate. The ethylene vinyl acetate component of the erucamide slip and anti-block agent is approximately 18% by weight vinyl acetate. The erucamide slip and anti-block agent has a density of approximately 0.94 gm/cm$^3$ and a melt index of approximately 2.5. The thermoplastic elastomeric films of the present invention contain approximately 10% by weight erucamide slip and anti-block agent.

A second anti-block agent is available from Ampacet Corp., Mount Vernon, N.Y. 10550 under the designation 10063. This material consists of 20% by weight silica in a low density polyethylene carrier. The low density polyethylene carrier has a melt index of approximately 9 and a density of 0.920 gm/cm$^3$. The films of the present invention may contain from about 0% to about 10% by weight of a silica-based anti-block agent.

Method of Manufacture

The thermoplastic elastomeric films of the present invention may be produced using a conventional blown-film extrusion process. The blown-film extrusion process is discussed on pages 50–59 of the U.S. Industrial Chemicals Processing Guide, Fourth Edition.

A method of making a preferred film of the present invention is described in Example 1 which follows.

Example 1

A thermoplastic elastomeric film of the present invention is made from a blend of 35% by weight G2730, 55% by weight UE-645 and 10% by weight CE-9619-1. The equipment used to produce the film of the present invention is conventional blown film extrusion processing equipment such as a Model Number IMB-250 vibratory blender/feeder manufactured by Cochran Company, New Lennox, Ill.; an electrically heated 3 ½ inch diameter extruder with a length to diameter ratio of 24:1, Model Number 4000 manufactured by Sterling Extruder Corp., South Plainfield, N.J.; and, an annular blown-film extrusion die manufactured by Egan Machinery, Somerville, N.J.

The raw materials, in pellet form, are dry blended in the vibratory blender/feeder and fed into the extruder where the materials are melted and further blended. The molten mixture is forced by the extruder into a die that includes a cylindrical mandrel located inside the die. The molten mixture surrounds the mandrel forming a tube which exits the die through an annular extrusion gap. Air passing through a conical air ring surrounding the annular extrusion gap is used to cool and solidify the tube of molten material. Once past the air ring, the tube is expanded into a bubble that is approximately twice the diameter of the annular extrusion gap by air which is injected through the mandrel of the die. The bubble is then collapsed on itself in a V-shaped collapsing frame, the edges of the flattened tube are slit, and the two resulting layers of film are wound on rollers under low tension.

During the production of the film, the extruder barrel temperature and die temperature are maintained at 380° Fahrenheit. The diameter of the annular extrusion gap of the particular die used was approximately 15 inches and the width of the extrusion gap was set at approximately 0.04 inches. Results of tests conducted on the film produced in this example are tabulated in Tables 1 and 2.

Example 2

A thermoplastic elastomeric film was made from a blend of 65% by weight G2730, 25% by weight UE-645 and 10% by weight CE-9619-1. The equipment used and the process conditions were the same as those described in Example 1.

Example 3

A thermoplastic elastic film was made from a blend of 35% by weight G2730, 45% by weight UE-645, 10% by weight CE-9619-1 and 10% by weight Ampacet 10063. The equipment used and the process conditions were the same as those described for Example 1.

Example 5

A thermoplastic elastic film was made from a blend of 50% by weight G2370, 35% by weight UE-645, 10% by weight CE-9619-1 and 5% by weight Ampacet 10063. The equipment used and the process conditions were the same as those described for Example 1.

Peel Strength Test

In order to test the peel strength of the seal formed by the film of the present invention, a test procedure was developed- First, individual test samples were prepared by placing a layer of the elastomeric film between a polyvinyl chloride substrate and a flexible polyester material with the machine direction of the elastomeric film aligned with the machine direction of the polyvinyl chloride substrate. One side of the polyester material is coated with a primer to facilitate adhesion to the elastomeric film. The polyvinyl chloride substrate used for the test is available from Shin-Etsu Polymer Co., Ltd., Tokyo, Japan under the trade designation SP 4800. The polyester material used for the text was a clear polyester film approximately 0,001 inch in thickness. The flexible polyester material was placed with its coated side against the elastomeric film to facilitate adhesion of the polyster film to the elastomeric film. The samples were then sealed using a modified Sentinel heat sealer, Model No. 12A, with a 1" inch-wide heated top jaw and a 1" silicone rubber bottom jaw. The temperature of the top jaw of the heat sealer was set and maintained at approximately 350° Fahrenheit. The jaw pressure was set at approximately 60 PSI and the sealer jaws were set to remain closed for a period of about one second. Prior to sealing the layered materials, the sealer was brought up to temperature with the jaws closed. The layered materials were then heat sealed by opening the jaws of the sealer, placing the layered materials between the jaws of the sealer with approximately 1" of layered materials extending beyond the jaws, and closing the jaws of the heat sealer for a period of one second. After the layered materials had been heat sealed, test strips were cut from the materials. The strips were ½" in width and 5" in length and included approximately 1" of materials that had not been heat sealed. The longer dimension of the test strips corresponded to the machine direction of the elastomeric film and polyvinyl chloride.

The peel strength of the elastomeric film was then determined, using an Instron Model 1130 test machine. The jaws of the Instron machine were set at a gauge length of approximately 2". The unsealed portion of the test strip was separated and the polyvinyl chloride substrate placed in one of the Instron machine's jaws and the elastomeric film and polyester material were placed in the other jaw. The jaws of the Instron machine were set to separate at a rate of 12 inches per minute. The force required to separate the elastomeric film from the polyvinyl chloride substrate was measured and recorded using a chart recorder. The average force required to separate the elastomeric film from the polyvinyl chloride substrate is recorded as peel strength and reported in grams per half inch of the sealed materials. Two test results for each of the films produced in Examples 1-5 are reported in Table 1.

TABLE 1

| Example # | Peel Strength (gm/½ inch) |
|---|---|
| 1 | 400 |
| 2 | 350 |
| 3 | 440 |
| 4 | 336 |
| 5 | 372 |

Typical average properties of the films corresponding to the compositions set forth in Examples 1-5 are set forth in Table 2 below. The results set forth in Table 2 were determined through the use of standard ASTM methods as indicated.

TABLE 2

| | | | | | | |
|---|---|---|---|---|---|---|
| G2730 | | 35% | 65% | 35% | 65% | 50% |
| UE - 645 | | 55% | 25% | 45% | 25% | 35% |
| CE - 9619 - 1 | | 10% | 10% | 10% | 10% | 10% |
| Ampacet 10063 | | — | — | 10% | 10% | 5% |
| Average Gauge (mils) | | 3.5 | 3.0 | 3.4 | 2.8 | 2.8 |
| Tensil Strength (p.s.i.) | MD | 2039 | 2363 | 1715 | 1833 | 2150 |
| (ASTM D-882) | TD | 1781 | 1921 | 1445 | 1457 | 1928 |
| Elongation (%) | MD | 675 | 659 | 641 | 566 | 638 |
| (ASTM D-882) | TD | 658 | 625 | 629 | 531 | 648 |
| Tear Strength (gr./mil) | MD | 34 | 66 | 78 | 73 | 73 |
| (ASTM D-1922) | TD | 38 | 118 | 75 | 47 | 72 |
| 1% Secant Modulus (psi) | MD | 1481 | 2378 | 2133 | 2794 | 2384 |
| (ASTM D-882) | TD | 1351 | 1032 | 1712 | 1815 | 1832 |
| Tensil Set (%) | MD | 24.0 | 9.5 | 25.0 | 12.0 | 16.7 |
| 200% Elongation | TD | 28.2 | 8.6 | 21.9 | 10.4 | 14.6 |
| (ASTM D-412) | | | | | | |
| Tensil Set (%) | MD | 97.4 | 36.3 | 111.5 | | 50.0 |
| 66.7 | | | | | | |
| 400% Elongation | TD | 98.3 | 33.8 | 102.1 | | 42.3 |
| 63.0 | | | | | | |
| (ASTM D-412) | | | | | | |

MD = Machine direction
TD = Transverse direction

The haze index of the films corresponding to the compositions set forth in Examples 1-5 ranged from about 65% to about 90% as measured by ASTM method D 1003.

While the particular embodiments of the present invention have been described, it will be apparent to those skilled in the art that various changes and modifications can be made without departing from the spirit and scope of the invention. The following claims are intended to cover all such modifications that are within the scope of this invention.

I claim:

1. A peelable thermoplastic film comprising:
   a blend for a film having a peel strength of at least about 300 gm/½ inch and a thickness of from about 0.0005 inch to about 0.02 inch, said blend including:
   (a) from about 40% to about 60% by weight of an A-B-A block copolymer, said A blocks being derived from polystyrene or a polystyrene homolog, said B blocks comprising an ethylene butene random copolymer, said block copolymer including approximately 30% by weight mineral oil;
   (b) from about 20% to about 50% by weight of an ethylene vinyl acetate copolymer; and
   (c) about 10% by weight of an erucamide anti-block concentrate.

2. The film of claim 1 further comprising from about 1% to about 10% by weight of a second anti-block concentrate, said second anti-block concentrate comprising a blend of polyethylene and silica.

3. The film of claim 1 wherein said ethylene vinyl acetate copolymer comprises approximately 28% by weight vinyl acetate.

4. The film of claim 1 wherein said film has a haze index from about 65% to about 90%.

5. The film of claim 1 wherein said erucamide anti-block concentrate comprises approximately 7% by weight erucamide, 20% by weight silica and 73% by weight ethylene vinyl acetate.

6. A peelable thermoplastic film comprising:
   a blend for a film having a peel strength of at least about 300 gm/½ inch and a thickness of from about 0.0005 inch to about 0.02 inch, said blend including:
   (a) from about 45% to about 55% by weight of an A-B-A block copolymer, aid A blocks being derived from polystyrene or a polystyrene homolog, said B blocks comprising ethylene butene random copolymer, said copolymer including approximately 30% by weight mineral oil;
   (b) from about 25% to about 45% by weight of an ethylene vinyl acetate copolymer; and
   (c) about 10% by weight of an erucamide anti-block concentrate.

7. The film of claim 6 further comprising from about 1% to about 10% by weight of a second anti-block concentrate, said second anti-block concentrate comprising a blend of polyethylene and silica.

8. The film of claim 6 wherein said ethylene vinyl copolymer comprises approximately 28% by weight vinyl acetate.

9. The film of claim 6 wherein said film has a haze index from about 65% to about 90%.

10. The film of claim 6 wherein said erucamide anti-block concentrate comprises approximately 7% by weight erucamide, 20% by weight silica and 73% by weight ethylene vinyl acetate.

* * * * *

UNITED STATES PATENT AND TRADEMARK OFFICE
CERTIFICATE OF CORRECTION

PATENT NO. : 5,334,643
DATED : August 2, 1994
INVENTOR(S) : Paul D. Gage

Page 1 of 2

It is certified that error appears in the above-indentified patent and that said Letters Patent is hereby corrected as shown below:

Column 2, line 3, "termpolymer" should be --term polymer--.

Column 2, line 42, "A-B--A" should be --A-B-A --.

Column 4, line 34, "developed- First" should be --developed. First--.

Column 4, line 45, "0,001" should be --0.001--.

Column 6, line 37, "aid" should be --said--.

UNITED STATES PATENT AND TRADEMARK OFFICE
CERTIFICATE OF CORRECTION

PATENT NO. : 5,334,643
DATED : August 2, 1994
INVENTOR(S) : Paul D. Gage

It is certified that error appears in the above-indentified patent and that said Letters Patent is hereby corrected as shown below:

Col. 4, line 24, Example 4 should be inserted

Example 4

A thermoplastic elastic film was made from a blend of 65% by weight G2730, 15% by weight UE-645, 10% by weight CE-9619-1 and 10% by weight Ampacet 10063. The equipment used and the process conditions were the same as those described for Example 1.

Signed and Sealed this

Sixth Day of June, 1995

*Attest:*

BRUCE LEHMAN

*Attesting Officer*   *Commissioner of Patents and Trademarks*